Sept. 23, 1958 G. C. HUGHES 2,853,268
PRESSURE REGULATOR
Filed March 25, 1954 2 Sheets-Sheet 1
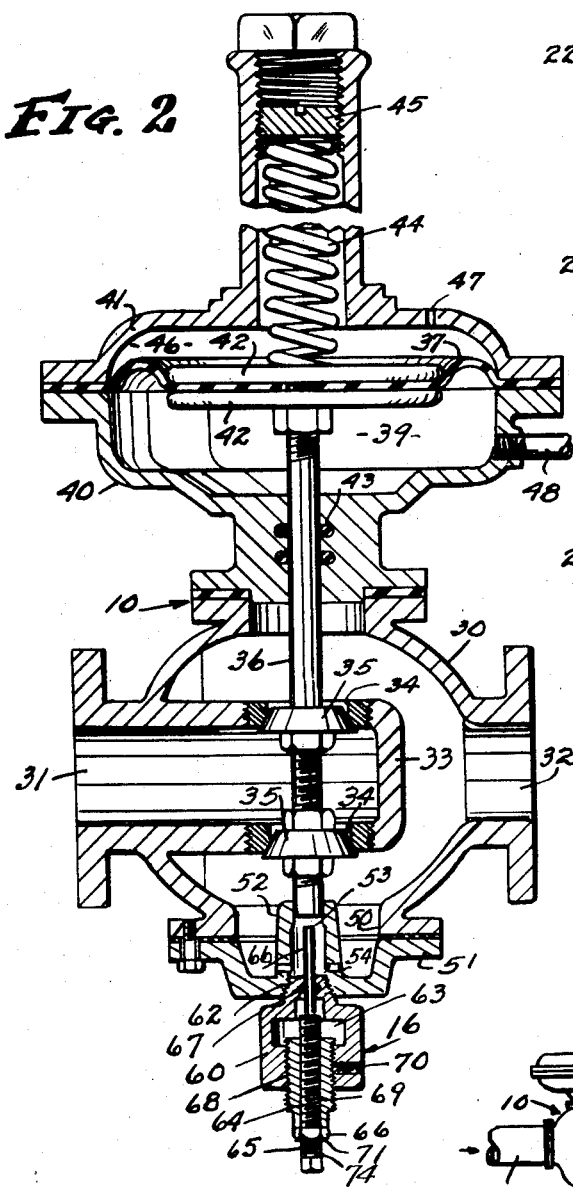
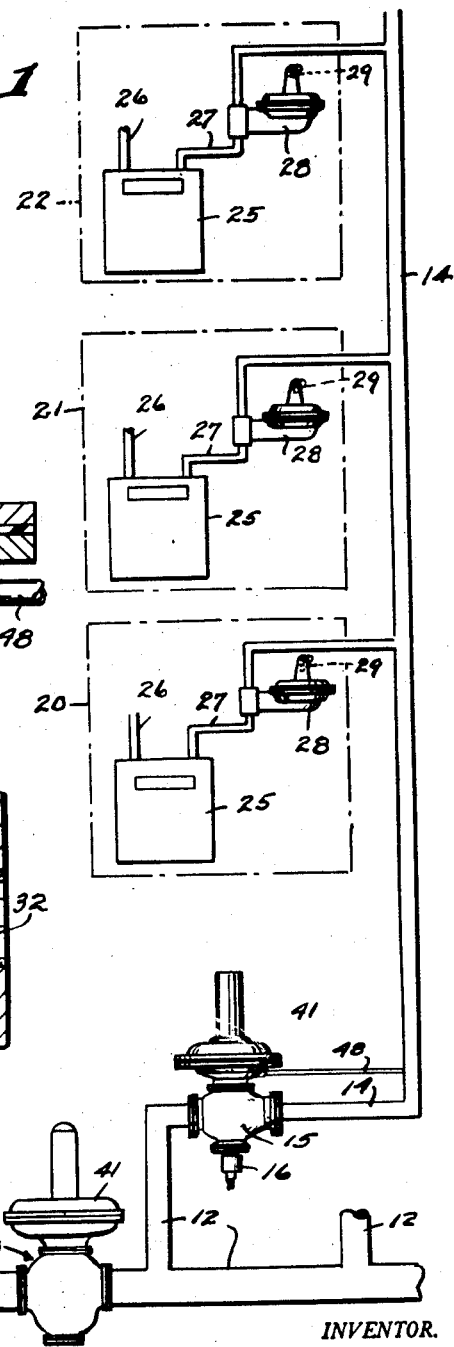
INVENTOR.
GEORGE C. HUGHES
BY
ATTORNEYS Sept. 23, 1958

G. C. HUGHES 2,853,268

PRESSURE REGULATOR

Filed March 25, 1954

INVENTOR.
GEORGE C. HUGHES
BY
Bates, Teare, & McKean
ATTORNEYS

United States Patent Office 2,853,268
Patented Sept. 23, 1958

2,853,268

PRESSURE REGULATOR

George C. Hughes, Anderson, Ind., assignor to Reynolds Gas Regulator Company, Anderson, Ind., a corporation of Indiana Application March 25, 1954, Serial No. 418,613

2 Claims. (Cl. 251—285)

This present invention is concerned with improvements in or relating to fluid distributing systems, and more particularly to a distribution system for regulating and controlling the flow of natural gas and the like.

The distribution of natural gas for household and industrial use, presents increasing difficulties. Rapid residential and industrial expansion, in many instances, has increased the pressures required in distribution mains to provide the necessary increase in volume of gas required at customer's installations or service lines. This has made the distribution more dangerous. At times the supply of gas is limited. In some instances this limitation is such that the addition of gas appliances by existing consumers may result in a serious pressure drop in the supply main, and in other consumer service lines which receive their supply from such supply lines. This likewise increases the hazards encountered in the distribution of the gas. The present invention provides a system of gas distribution which decreases the hazards above-mentioned and which eliminates the ill effects to other consumers of a sudden increase in the demand by one consumer.

According to the invention gas is fed from a high pressure main to an intermediate high pressure supply line through a pressure reducing and regulating device which serves to maintain a constant pressure in the intermediate supply line. Gas from the supply line passes to a plurality of consumers service lines through individual pressure regulating devices, each of which acts to further reduce the pressure of the gas and to maintain their respective service line pressure below a predetermined desired maximum. Each of the individual regulating devices includes a limiting device to limit the rate of flow of gas from the supply line to the respective consumer service line. Accordingly, should one consumer increase his demand for gas, as for instance by the addition of gas appliances to his service line, the respective limiting device will restrict the rate of flow to such service line to a predetermined maximum and prevent depletion of the associated supply line pressure.

Other objects and advantages of the invention will become more apparent from the following description of a practical embodiment of the invention illustrated in the accompanying drawings in which:

Fig. 1 is a diagrammatic view of a gas distribution system constructed in accord with the present invention;

Fig. 2 is a centrally located vertical section through one of the pressure regulating devices used in the system;

Figure 3:
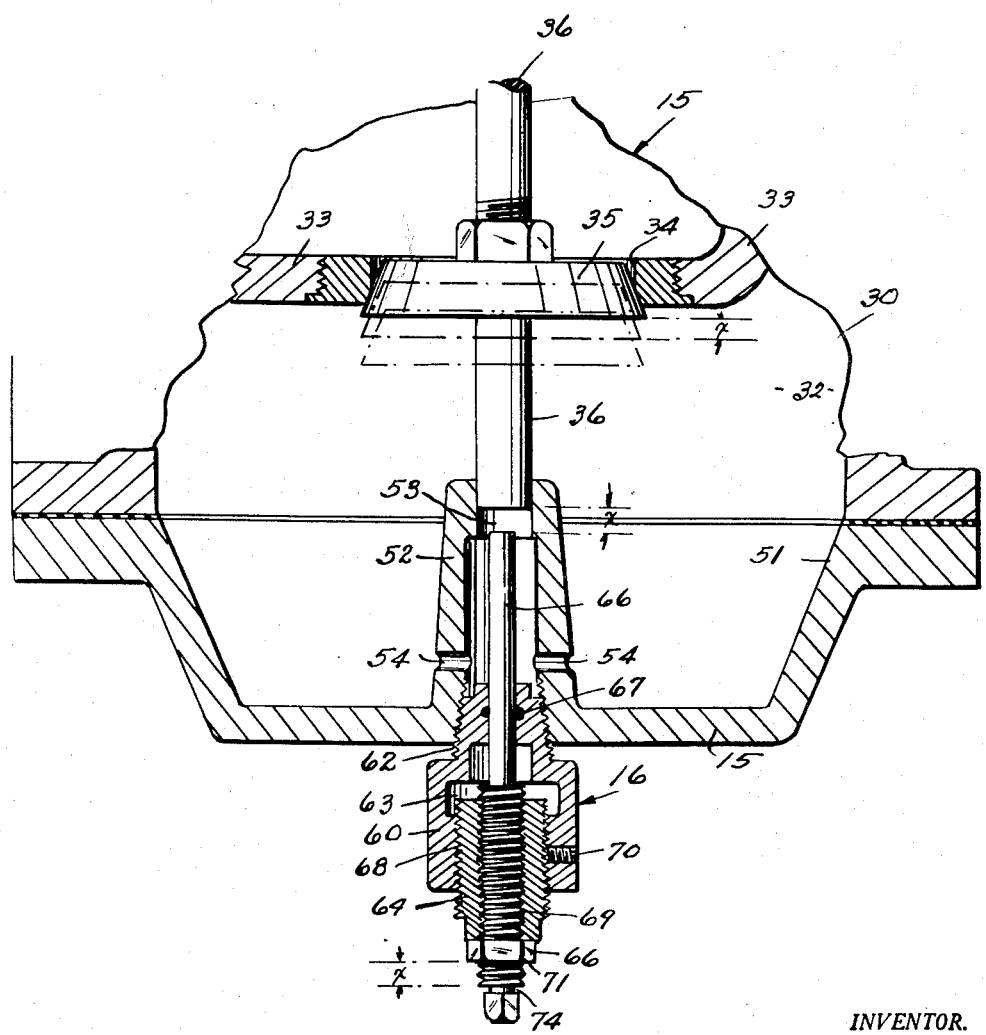
Fig. 3 is an enlarged vertical section of the flow limiting device incorporated in the regulator of Fig. 2, the section being taken in substantially the same plane as that of Fig. 2.

The improved gas distribution system as illustrated in Fig. 1 includes a pressure regulating valve 10 which is disposed between source of gas at high pressure 11, and a high pressure main 12. The high pressure main 12 is connected with a plurality of supply lines 14 through respective pressure regulating and reducing regulators 15, each of which is responsive to the pressure on its outlet side, namely, in its respective supply line 14, and each of which serves to reduce the pressure in the high pressure main to a predetermined intermediate pressure and to maintain such predetermined pressure in the respective supply line. Each regulator 15 includes a flow restricting device generally indicated at 16 which limits the rate of flow of the gas through the respective regulator so that the maximum volume of gas which may pass through the regulator will be limited to a predetermined number of cubic feet of gas per hour based on a predetermined inlet pressure established by the regulator 10. This volume is determined by the normal maximum demand expected to be required by the consumer installations 20, 21 and 22 which are connected with the respective supply line 14. While only three consumer installations are indicated in the drawing, it is to be understood that this number is merely to facilitate illustration of the invention and that, actually, a far greater number of consumer installations may be supplied by each supply line 14.

Each consumer installation is illustrated as having a meter 25, the outlet of which is connected by a consumer's line 26 with various appliances, not shown, but used by such consumer. The inlet of this meter is connected by a service line 27 with the supply line 14 through the medium of a pressure reducing regulator 28. Each regulator 28 reduces the intermediate pressure in the supply line 14 to the comparatively low pressure desired at the consumer's appliances. These regulators 28 each include a flow restricting device, generally indicated at 29, which restricts the volume of gas that may flow to the respective meter to the maximum normal flow required by the respective consumer.

From the above description it will be seen that, should one consumer add an appliance to his installation which would materially increase the flow of gas required to meet his demand, the service regulator 28 of his installation would limit the rate of flow to that which was normal prior to the installation of the added appliance. While this limiting of the flow could cause a loss of pressure in such consumer's service line 27, it nevertheless will not effect the pressure or supply of the other consumer installations receiving their gas from the same supply line 14. This materially reduces the well known hazards which accompany pressure drops in distribution systems.

When the improved system is used and a pressure loss is reported by a consumer to those in charge of distribution, the locus of the cause of such loss is known to be restricted to such consumer's installation. This localization permits rapid determination of the ultimate cause and permits corrective measures to be made with a minimum loss of time. If the pressure loss is due to an added appliance and conditions permit, the consumer's regulator 28 and the supply line regulator 15 may be adjusted to permit a greater flow of gas. For this purpose the limiting devices 16 and 29 are constructed to permit adjustment thereof without interruption of the flow of gas.

Prior to the present invention the reporting of a pressure loss by one consumer merely indicated that there was an abnormal demand somewhere in the system. This required a systematical check of all installations to determine the cause of the pressure drop. Accordingly it will be seen that the use of the present invention reduces the cost of distribution as well as the hazards connected therewith.

The regulators 10 and 15 shown in Fig. 2 each may include a valve body 30 having an inlet 31 adapted to be connected with the source of high pressure 11 or a high pressure main 12, and an outlet 32 adapted to be connected with a high pressure main 12 or service main 14. The inlet and outlet 31 and 32 are separated by a partition wall 33 having a single valve port or opening extending therethrough or, as shown, a pair of aligned ports 34. The flow of fluid through the valve ports 34 is controlled by valve members 35 secured to a common valve stem 36. The position of this stem, as well as that of the valve members relative to their associated ports is under the control of a flexible pressure responsive diaphragm 37 which is stretched across a pressure chamber 39 formed in a diaphragm casing 40 supported at top the body 30. The periphery of the diaphragm 37 is shown as clamped to the casing 40 by a hollow cap 41. The central portion of the diaphragm is clamped between a pair of rigid discs 42 which are secured to the upper end of the valve stem 36. Suitable packing material 43 coacts with the stem 36 and prevents seepage of fluid along the valve stem to and from the pressure chamber 39 below the diaphragm. The diaphragm 37 and the valve members 35 are biased to an open position by a spring 44 interposed between an adjustable stop 45 carried by the cap 41 and the upper face of the top disc 42. The chamber 46 above the diaphragm 37 is vented to atmosphere by a vent opening or port 47. The pressure chamber 39 below the diaphragm 37 is connected by a conduit 48 with the high pressure main 12, or the supply line as the case may be. When the pressure in the main 12 or the line 14 reaches the desired maximum the pressure on the underside of the diaphragm 37 will move the valve members 35 toward their seat permitting only such flow of gas through the valve ports as will maintain the desired pressure in their line 12 at the desired maximum.

As heretofore mentioned, the rate of flow of gas through the regulator 15 is limited by the limiting device 16. This device acts to restrict or limit the opening movement of the valve members 35. As shown in Figs. 2 and 3 the lower end of the valve body 30 has an opening 50 which is closed by closure plate 51. This plate is provided with an internal upwardly extending boss 52 having a vertical opening or guideway 53 axially aligned with the valve stem 36 and into which the lower end of such stem extends. Suitable orifices 54 extending through the boss at the base thereof maintain the pressure in the opening or guideway 53 equal to that of the outlet pressure of the regulator. The lower end of the guideway 53 is closed by the limiting device 16.

The limiting device 16 includes a hollow body 60 secured to the closure plate 51 in axial alignment with the guideway 53, as for instance, by the tapered threaded connection 62. The body 60 has an axial opening 63 extending therethrough. A sleeve 64 is mounted in the lower wall of the body 60 for movement to and from the valve stem 36. A rod 65 is threadingly mounted in the sleeve 64 in axial alignment with the stem 36 and is provided with an upwardly extending portion 66 which projects through the upper wall of the body 60 into the guideway 53. Packing material 67 carried by the body prevents escape of gas or fluid along the rod portion 66.

The threaded connection 68 between the sleeve 64 and the body 60, and the threaded connection 69 between the rod 65 and the sleeve 60 are both straight accurately formed and spaced threads to permit accurate adjustment of the sleeve 64 and the rod 65 relative to the body 60 and each other. The sleeve 64 is normally retained in an adjusted position by a set screw 70 carried by the body 60, while the rod 65 is retained in its adjusted position relative to sleeve 64 by a locknut 66 which engages the bottom face of the sleeve.

Adjustment of the limiting device 16 is accomplished by withdrawing the sleeve 64 a distance sufficient to permit the rod 65 to be moved to a position where a shoulder or other index mark 74 on the rod is flush with the bottom face of the locknut 71 when the latter is substantially in its locking position. The sleeve 64 then is rotated until the upper end of the rod portion 66 abuts the lower face of the valve stem 36 and valve 35s are seated or in their port closing positions. The set screw 70 is then tightened to retain the sleeve in its adjusted position. The rod is then turned, moving its outward away from the valve stem 36 until the end of the rod portion 66 has been lowered a distance equivalent to the desired maximum opening movement of the valve. This distance is equal to the distance between the end of the locknut 71 and the index 74. The desired distance is readily calculated by observing the number of threads between the bottom of the locknut and the index 74 of the rod, which threads as heretofore mentioned are accurately cut and their spacing known.

The maintenance of a constant known pressure in the high pressure main 12 by the regulating device 10, together with the use of a valve orifice having a known area permits calculation of the maximum volume of gas which may pass through the regulator 10 with a predetermined setting of the adjusting rod 74. This enables the limiting device to be set to pass only the normal flow of gas required by the combined consumer installations which are serviced by its respective supply line 14.

From the above description it will be seen that the service regulators 28 may readily be adjusted to permit a maximum flow equal to that demanded by the consumer installation. If the demand of the consumer installation should be increased by the addition of appliances or the like the flow restricting device 29 would restrict the opening of the regulator 28 and prevent a pressure drop in the associated service line 14.

It is contemplated that the regulators 10 may likewise be used as service regulators. In some instances it may be desirable that the service regulators be similar to that shown in Figs. 2 and 3, as the limiting device 16 associated therewith is capable of being adjusted with a much higher degree of precision than those of the regulators 28.

One of the advantages of the present invention is the fact that the system permits use of regulators which have a much greater flow capacity than is required when the system is originally installed and at the same time reduces the hazards normally present in gas distribution systems. This has several advantages, among which is the ease with which the system may be adjusted to compensate for increases in consumption by existing consumers or by added consumer installations, neither of which require replacement of existing regulators.

I claim:

1. In a gas pressure regulating valve including a limiting device having a valve housing having an inlet and an outlet separated by a partition wall provided with a valve port, a valve member movable to and from said port to control the flow of fluid therethrough, said limiting device including a hollow body secured to the valve housing and having an opening extending therethrough and in axial alignment with said valve member, a sleeve threadingly mounted in said body for adjustment axially to and from the valve member, a rod threadingly mounted in said sleeve for adjustment to and from the valve member relative to the sleeve, said rod having a portion thereof extending axially towards said valve member and having means rigidly carried thereby extending externally of said sleeve and providing an index, means associated with and exterior of said sleeve providing a second index, said rod being moved axially relative to said sleeve until said first-mentioned means registers with said second-mentioned means, and the sleeve and rod thereafter being adjustable as a unit to move the rod into contact with said valve member when the latter is in its closed position, said rod and sleeve being of such length as to provide for said contact, means to secure the sleeve in such adjusted position, whereby when the rod is thereafter moved away from the valve the distance between the two externally positioned indices will provide a visible indication of the distance the valve member may be moved away from its seat.

2. In a gas pressure regulating valve including a limiting device having a valve housing provided with an inlet and an outlet separated by a partition wall provided with a valve port opening, a valve member movable to and from said port to control the flow of gas through the valve port, a valve stem for said valve and an opening through which said valve stem is axially accessible, said limiting device including a body adapted to be secured to the valve housing to close said opening, a sleeve threadingly mounted in said body in axial alignment with and adjustably movable to and from one end of the valve stem, a rod threadingly mounted in said sleeve for adjustment movement to and from such end of the valve stem and relative to said sleeve and body, said rod having a portion thereof extending axially through said body towards said valve stem and adapted to coact therewith to limit the opening movement of said valve, means to prevent the flow of gas along said rod into said body, said rod having a shoulder positioned externally of said sleeve and providing an index, means associated with said sleeve having a shoulder providing a second index, said rod and sleeve being so related one to the other that the rod may be moved into contact with said valve stem when the valve member is in its port closing position, said rod being moved axially relative to said sleeve until said shoulder on said rod engages said shoulder on said means, said sleeve and rod thereafter being adjustable axially as a unit until said rod contacts said valve member in its port closing position, means to secure the sleeve in such adjusted position, whereby when the rod is thereafter moved away from the valve stem the distance between the two externally positioned indices will provide a visible indication of the distance the valve may be opened.

References Cited in the file of this patent

UNITED STATES PATENTS

| | | |
|---|---|---|
| 323,685 | Hoeveler | Aug. 4, 1885 |
| 463,235 | Griffin | Sept. 9, 1890 |
| 1,774,994 | Pfoutz | Sept. 2, 1930 |
| 1,877,938 | Moore | Sept. 20, 1932 |
| 1,894,391 | Barrett | Jan. 17, 1933 |
| 1,897,517 | Hughes | Feb. 14, 1933 |
| 1,903,028 | Carlson | Mar. 28, 1933 |
| 2,111,560 | Fox | Mar. 22, 1938 |
| 2,336,173 | Henderson | Dec. 7, 1943 |
| 2,420,370 | Hamilton | May 13, 1947 |